TELEVISION MULTIPLEX SYSTEM AND APPARATUS

Filed April 22, 1953 2 Sheets-Sheet 1

INVENTOR

KEES TEER

BY [signature]

AGENT

TELEVISION MULTIPLEX SYSTEM AND APPARATUS

Filed April 22, 1953 2 Sheets-Sheet 2

INVENTOR
KEES TEER
BY [signature]
AGENT

United States Patent Office 2,787,660

Patented Apr. 2, 1957

2,787,660

TELEVISION MULTIPLEX SYSTEM AND APPARATUS

Kees Teer, Eindhoven, Netherlands, assignor, by mesne assignments, to North American Philips Company, Inc., New York, N. Y., a corporation of Delaware Application April 22, 1953, Serial No. 350,355

Claims priority, application Netherlands May 1, 1952

7 Claims. (Cl. 179—15)

This invention relates to a multiplex transmission system for television information signals in which for the transmission of the information signals two carrier waves are used in the transmission path, of which the side-bands overlap at least in part and with a phase-relation such that interference in the receiver which is due to the overlapping of the side-bands and which occurs during a frame period, is substantially neutralised visually by a similar interference in the subsequent frame period, the upper side-band of the carrier wave of the lower frequency and the lower side-band of the carrier of the higher frequency being transmitted. In such systems, in order to separate the information signals in the receiver, it is in most cases necessary either to provide a color switch operating at line-frequency, frame-frequency or field-frequency, or to generate an auxiliary carrier-wave or punctuating signal of suitable shape, frequency and phase, which means considerable complication and increased cost of the receiver.

The system according to the invention mitigates the said disadvantage and is characterized in that the frequency difference of the two carrier-waves is at least equal to the highest frequency of the two information signals to be transmitted and that one side-band comprises the sum of the two information signals plus a constant signal and the other side-band comprises the difference of the two information signals plus a constant signal, the two information signals being separated at the receiving end with the use of two demodulating stages which are tuned to the two carrier-wave frequencies, the demodulated signals being combined in both the positive and the negative sense.

In order that the invention may be readily carried into effect, it will now be described with reference to the accompanying drawings showing, by way of example, the system according to the invention and the transmitter and receiver for the system.

For a good understanding of the system according to the invention it will first be assumed that two signals $S_1$ and $S_2$ which, in order to have sufficient informative value, must be limited only to approximately a frequency $f_p$, are to be transmitted in a frequency range which is only slightly greater than $f_p$.

Figure 1:
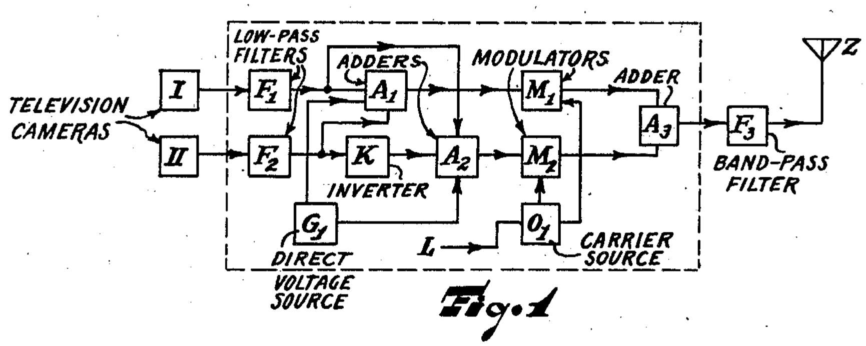
Fig. 1 shows diagrammatically one embodiment of a transmitter for a system according to the invention for the transmission of two television signals.

Fig. 1 shows in block diagram one embodiment of a transmitter for the multiplex-transmission system according to the invention which is suitable for the transmission of two television information signals. The devices I and II represent television cameras by which the information signals $S_1$ and $S_2$ are produced. Said signals are supplied to low-pass filters $F_1$ and $F_2$, which have a cut-off frequency $f_p$. Hereinafter $S_1$ and $S_2$ will indicate the signals which are limited to a frequency $f_p$. The output signal of low-pass filter $F_1$ is supplied to adding devices $A_1$ and $A_2$. The output signal of low-pass filter $F_2$ is supplied to adding device $A_1$ and to an inverting device $K_1$ by which the polarity of this signal is inverted, whereafter said signal is supplied to adding device $A_2$. Furthermore, the adding devices $A_1$ and $A_2$ have supplied to them direct voltages A and B respectively, which are derived from a direct-voltage source $G_1$. The object of the said direct voltage will be made clear hereinafter. The output signal of adding device $A_1$, viz. $S_1+S_2+A$, is modulated in a modulator $M_1$ on a carrier wave cos $\omega_d t$, in which $\omega_d=2\pi f_d$. The output signal of adding device $A_2$, viz $S_1-S_2+B$, is modulated in a modulator $M_2$ on a carrier wave $\pm$ cos $(\omega_d+\omega_p)t$, in which $\omega_p=2\pi f_p$, and $f_p$ is the limiting frequency of the signals $S_1$ and $S_2$, the plus sign being valid during one frame period and the minus sign during an immediately following frame period, so that $t=0$ is chosen at the beginning of each new frame period. The carrier waves cos $\omega_d t$ and cos $(\omega_d+\omega_p)t$ are derived from a device $O_1$, which comprises the oscillators suitable for the purpose.

Figures 2, 3, 4, 5, 6, 7, 8, 9, 10, 11:
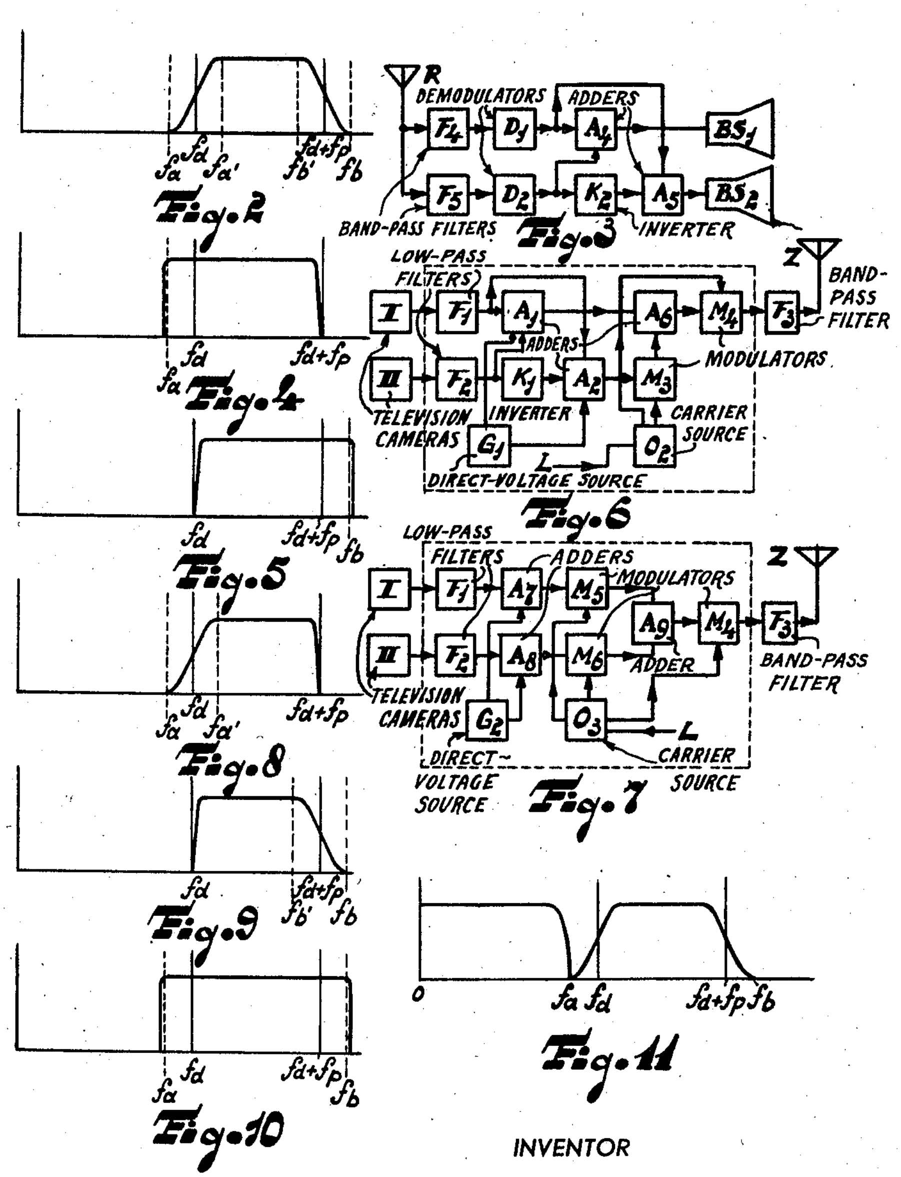
Fig. 2 shows the transmission curve of a band-pass filter such as used at the transmitting end.
Fig. 3 shows diagrammatically one embodiment of a television receiver co-operating with the transmitter shown in Fig. 1.
Figs. 4 and 5 show the transmission curves of band-pass filters such as used at the receiving end.
Figs. 6 and 7 show diagrammatically embodiments of transmitters, also intended for systems according to the invention, for the transmission of two television signals.
Figs. 8 and 9 show the transmission curves of band-pass filters such as may be used at the receiving end.
Fig. 10 shows the transmission curve of a band-pass filter such as may be used at the transmitter.
Fig. 11 shows the frequency spectrum of one embodiment of a multiplex-transmission system according to the invention.

The output signals of modulators $M_1$ and $M_2$ are supplied to an adding device $A_3$ and the signal occurring at the output thereof may be supplied to a transmitting aerial Z after having passed through a band-pass filter $F_3$, of which the transmission curve is shown in Fig. 2. The transmitted signal in this case comprises two carrier waves, of which that of the lower frequency is modulated in the upper side-band by a signal $S_1+S_2+A$ and that of the higher frequency is modulated in the lower side-band by a signal $S_1-S_2+B$.

Fig. 3 shows in block diagram one embodiment of a receiver for the multiplex transmission system according to the invention, which is suitable for the reception of signals emitted by the transmitter shown in Fig. 1. The signal received by the receiving aerial R is supplied to two band-pass filters $F_4$ and $F_5$, which have transmission curves as shown in Figs. 4 and 5 respectively. The output signals of $F_4$ and $F_5$ are supplied to demodulating devices $D_1$ and $D_2$ respectively. The output signal of demodulator $D_1$ comprises a signal $S_1+S_2$ plus an interference signal and the output signal of demodulator $D_2$ comprises the signal $S_1-S_2$ plus another interference signal. The output signal of demodulator $D_1$ is supplied to adding devices $A_4$ and $A_5$ and the output signal of demodulator $D_2$ is supplied to adding device $A_4$ and to an inverting device $K_2$ by which the polarity of the signal is inverted, whereafter it is supplied to adding device $A_5$.

The signal $S_1$ plus an interference signal thus occurring in the output circuit of adding device $A_4$ is supplied to an image tube $BS_1$, whereas the signal $S_2$ plus an interference signal which occurs in the output circuit of adding device $A_5$ is supplied to an image tube $BS_2$.

However, the influence of the interference signals is substantially neutralised visually in known manner by the afore-mentioned periodical change of plus sign into minus sign of the carrier wave $\cos(\omega_d+\omega_p)t$ at the beginning of each new frame period. This change of polarity may be ensured, for example, either by giving $f_p$ a value corresponding to an odd multiple of half the line-frequency, provided that a complete image is composed from an odd number of lines, or by subjecting the carrier wave $\cos(\omega_d+\omega_p)t$ to a phase shift at the beginning of a new frame period. For this purpose, the device $O_1$ is controlled by means of line- or frame-synchronising pulses received at L.

In order that the operation of the system described with reference to Figs. 1 to 5 may be more clearly understood, we start from a signal $S_1=a+b\cos\omega_1 t$ and a signal $S_2=c+d\cos\omega_2 t$. The signal at the input of modulator $M_1$ is in this case:

$$S_1+S_2+A=a+b\cos\omega_1 t+c+d\cos\omega_2 t+A$$

and the output signal of this modulator is:

$$S(M_1)=a\cos\omega_d t+\tfrac{1}{2}b\cos(\omega_d+\omega_1)t+\tfrac{1}{2}b\cos(\omega_d-\omega_1)t+c\cos\omega_d t+\tfrac{1}{2}d\cos(\omega_d+\omega_2)t+\tfrac{1}{2}d\cos(\omega_d-\omega_2)t+A\cos\omega_d t$$

The signal at the input of modulator $M_2$ is:

$$S_1-S_2+B=a+b\cos\omega_1 t-c-d\cos\omega_2 t+B$$

and the output signal of this modulator is:

$$S(M_2)=\pm a\cos(\omega_d+\omega_p)t+\tfrac{1}{2}b\cos(\omega_p+\omega_d+\omega_1)t\pm\tfrac{1}{2}b\cos(\omega_p+\omega_d-\omega_1)t\mp c\cos(\omega_d+\omega_p)t\mp\tfrac{1}{2}d\cos(\omega_d+\omega_p+\omega_2)t\mp\tfrac{1}{2}d\cos(\omega_d+\omega_p-\omega_2)t\pm B\cos(\omega_d+\omega_p)t$$

The signal $S(M_1)+S(M_2)$ is now led through band-pass filter $F_3$ which has a transmission curve as shown in Fig. 2. At the frequencies $f_d$ and $f_d+f_p$, the curve is decreased to half and also exhibits radial symmetry relatively to the said frequencies, at least within given limits in the vicinity thereof, in this case between the frequencies $f_a$ and $f_a'$ and between the frequencies $f_b$ and $f_b'$.

For the sake of completeness, it is mentioned that the term "radial symmetry" is to be understood to mean the phenomenon that, if the transmission ratio of the filter at a frequency $f_d+f_q$ assumes the value $\gamma$, this value is equal to $1-\gamma$ at the frequency $f_d-f_q$, if 1 represents the maximum transmission ratio of the filter. The output signal S(U) of filter $F_3$, which is transmitted by transmitting aerial Z and received by receiving aerial R, is thus:

$$S(U)=\tfrac{1}{2}(a+c)\cos\omega_d t\pm\tfrac{1}{2}(a-c)\cos(\omega_d+\omega_p)t+\tfrac{1}{2}b(\cos(\omega_d+\omega_1)t\pm\cos(\omega_d+\omega_p-\omega_1)t)+\tfrac{1}{2}d(\cos(\omega_d+\omega_2)t\mp\cos(\omega_d+\omega_p-\omega_2)t)+\tfrac{1}{2}A\cos\omega_d t\pm\tfrac{1}{2}B\cos(\omega_d+\omega_p)t$$

Thus, a signal $$S(F_4)=\tfrac{1}{2}(a+c)\cos\omega_d t+\tfrac{1}{2}b(\cos(\omega_d+\omega_1)t\pm\cos(\omega_d+\omega_p-\omega_1)t)+\tfrac{1}{2}d(\cos(\omega_d+\omega_2)t\mp\cos(\omega_d+\omega_p-\omega_2)t)+\tfrac{1}{2}A\cos\omega_d t$$

or a signal $$S(F_4)=\tfrac{1}{2}[(a+c+A+b\cos\omega_1 t\pm b\cos(\omega_p-\omega_1)t+d\cos\omega_2 t\mp d\cos(\omega_p-\omega_2)t).\cos\omega_d t-(b\sin\omega_1 t\pm b\sin(\omega_p-\omega_1)t+d\sin\omega_2 t\mp d\sin(\omega_p-\omega_2)t)\sin\omega_d t]$$

occurs in the receiver at the output of band-pass filter $F_4$ having the transmission curve shown in Fig. 4, that is to say cut-off frequencies at $f_a$ and a frequency which is somewhat smaller than $f_d+f_p$.

If the direct voltage A is given a value such that the distortion which occurs due to the one-side-band transmission remains within determined limits, that is to say is, for example, not greater than the distortion which occurs with the conventional one-side-band transmission of black-white television, the output signal of demodulator $D_1$ is the signal $S(D_1)$:

$$S(D_1)=\tfrac{1}{2}(a+b\cos\omega_1 t+c+d\cos\omega_2 t\pm b\cos(\omega_p-\omega_1)t\mp d\cos(\omega_p-\omega_2)t+A)\quad S(D_1)=\tfrac{1}{2}(S_1+S_2\pm S_1'\mp S_2'+A)$$

in which $S_1'$ and $S_2'$ are interference signals originating from $S_1$ and $S_2$ respectively.

A signal $$S(F_5)=\pm\tfrac{1}{2}(a-c)\cos(\omega_d+\omega_p)t+\tfrac{1}{2}b(\cos(\omega_d+\omega_1)t\pm\cos(\omega_d+\omega_p-\omega_1)t)+\tfrac{1}{2}d(\cos(\omega_d+\omega_2)t\mp\cos(\omega_d+\omega_p-\omega_2)t)\pm\tfrac{1}{2}B\cos(\omega_d+\omega_p)t$$

or a signal $$S(F_5)=\pm\tfrac{1}{2}[(a-c+B+b\cos\omega_1 t-d\cos\omega_2 t\pm b\cos(\omega_p-\omega_1)t+d\cos(\omega_p-\omega_2)t).\cos(\omega_d+\omega_p)t-(\mp b\sin(\omega_p-\omega_1)t-b\sin\omega_1 t\mp d\sin(\omega_p-\omega_2)t+d\sin\omega_2 t)\sin(\omega_d+\omega_p)t]$$

occurs at the output of band-pass filter $F_5$ having the transmission curve shown in Fig. 5, that is to say cut-off frequencies at $f_b$ and a frequency which is somewhat greater than $f_d$.

By suitable choice of the direct voltage B, the output signal of demodulator $D_2$ is:

$$S(D_2)=\tfrac{1}{2}(a+b\cos\omega_1 t-c-d\cos\omega_2 t\pm b\cos(\omega_p-\omega_1)t\pm d\cos(\omega_p-\omega_2)t+B)\quad S(D_2)=\tfrac{1}{2}(S_1-S_2\pm S_1'\pm S_2'+B)$$

The output signal of adding device $A_4$ thus is:

$$S(D_1)+S(D_2)=S_1\pm S_1'+\tfrac{1}{2}(A+B)$$

and the output signal of adding device $A_5$:

$$S(D_1)-S(D_2)=S_2\mp S_2'+\tfrac{1}{2}(A-B)$$

The signals $S(D_1)+S(D_2)$ and $S(D_1)-S(D_2)$ may be supplied to the image tubes $BS_1$ and $BS_2$ respectively, it being possible, for example, by suitable choice of the grid-biassing potentials that the direct-voltage components $\tfrac{1}{2}(A+B)$ and $\tfrac{1}{2}(A-B)$ of the signals are made inactive.

Now, the interference signals $S_1'$ and $S_2'$ are still superposed on the desired signals, i. e. $S_1$ and $S_2$, that is to say on $S_1$ only $S_1'$, the interference signal originating from $S_1$, and to $S_2$ only $S_2'$, the interference signal originating from $S_2$.

Due to the change of plus sign into minus sign and hence by inversion of the polarity of the said interference signals at the beginning of each new frame period, the eye will substantially not be affected by the interference signals if the frame-frequency is not too low.

A further method of obtaining the signal S(U) is to combine the signal $S_1+S_2+A$ in the positive sense with the signal $S_1-S_2+B$ which is modulated on the carrier wave $\pm 2\cos\omega_p t$ and to modulate the combined signal on a carrier wave $\cos\omega_d t$, the resultant signal subsequently being led again through a filter as shown in Fig. 2. A transmitter in which this method is used is shown in Fig. 6. The devices I, II, $F_1$, $F_2$, $A_1$, $A_2$, $K_1$ and $G_1$ are identical with the corresponding devices shown in Fig. 1. The signals $\cos\omega_d t$ and $\cos\omega_p t$ are derived in Fig. 6 from a device $O_2$ comprising suitable oscillators. The output signal of adding device $A_1$ is, as before, $S_1+S_2+A$ and the output signal of modulator $M_3$ is $\pm 2\cos\omega_p t\,(S_1-S_2+B)$ and hence if, as above, $S_1=a+b\cos\omega_1 t$ and $S_2=c+d\cos\omega_2 t$, we have:

$$S(A_1)=a+b\cos\omega_1 t+c+d\cos\omega_2 t+A$$

$$S(M_3)=\pm 2a\cos\omega_p t\pm b\cos(\omega_p+\omega_1)t\pm b\cos(\omega_p-\omega_1)t\mp 2c\cos\omega_p t\mp d\cos(\omega_p+\omega_2)t\mp d\cos(\omega_p-\omega_2)t\pm 2B\cos\omega_p t$$

The output signal $S(A_1)+S(M_3)$ of adding device $A_6$ is modulated in modulator $M_4$ on a carrier wave $\cos \omega_d t$, so that a signal $S(M_4)$ ensues:

$$S(M_4)=a(\cos \omega_d t \pm \cos(\omega_d+\omega_p)t \pm \cos(\omega_d-\omega_p)t)$$
$$+\tfrac{1}{2}b(\cos(\omega_d+\omega_1)t+\cos(\omega_d-\omega_1)t \pm \cos(\omega_d+\omega_p+\omega_1)t \pm \cos(\omega_d-\omega_p-\omega_1)t \pm \cos(\omega_d+\omega_p-\omega_1)t \pm \cos(\omega_d-\omega_p+\omega_1)t)$$
$$c(\cos \omega_d t \mp \cos(\omega_d+\omega_p)t \mp \cos(\omega_d-\omega_p)t)$$
$$+\tfrac{1}{2}d(\cos(\omega_d+\omega_2)t+\cos(\omega_d-\omega_2)t \mp \cos(\omega_d+\omega_p+\omega_2)t \mp \cos(\omega_d-\omega_p-\omega_2)t \mp \cos(\omega_d+\omega_p-\omega_2)t \mp \cos(\omega_d-\omega_p+\omega_2)t)$$
$$+A \cos \omega_d t+B(\pm\cos(\omega_d+\omega_p)t \pm \cos(\omega_d-\omega_p)t)$$

After the signal $S(M_4)$ has traversed band-pass filter $F_0$ having a transmission curve as shown in Fig. 2, transmitting aerial Z emits a signal:

$$\tfrac{1}{2}(a+c+A)\cos \omega_d t \pm \tfrac{1}{2}(a-c+B)\cos(\omega_d+\omega_p)t+\tfrac{1}{2}b(\cos(\omega_d+\omega_1)t \pm \cos(\omega_d+\omega_p-\omega_1)t)+\tfrac{1}{2}d(\cos(\omega_d+\omega_2)t \mp \cos(\omega_d+\omega_p-\omega_2)t)=S(U)$$

which is thus similar to the signal which is emitted by the transmitter shown in Fig. 1.

A further method of obtaining the signal $S(U)$ is, for example, to punctuate signal $S_1$ plus a direct-voltage component $\tfrac{1}{2}(A+B)$ with a signal $1\pm 2\cos \omega_p t$ and to punctuate signal $S_2$ plus a direct-voltage component $\tfrac{1}{2}(A-B)$ with a signal $1\mp 2\cos \omega_p t$, subsequently to combine the resultant signals in the positive sense and to modulate the combined signal on a carrier wave $\cos \omega_d t$, the modulated carrier wave finally being led through a band-pass filter as shown in Fig. 2. The plus-minus sign means, as before, that if $t=0$, at the beginning of each frame period, the plus sign is valid during a determined frame period, the minus sign during the subsequent frame period, then again the plus sign, etc.

A transmitter in which this method is used is shown in Fig. 7. The devices I, II, $F_1$ and $F_2$ are identical with the corresponding devices shown in Figs. 1 and 6.

The signals $1\pm 2\cos \omega_p t$, $1\mp 2\cos \omega_p t$ and $\cos \omega_d t$ are derived from a device $O_3$ as shown in Fig. 7, which comprises the oscillators suitable for the purpose. The direct voltages $\tfrac{1}{2}(A+B)$ and $\tfrac{1}{2}(A-B)$ are derived from the direct-voltage source $G_2$ of Fig. 7. A signal $S_1+\tfrac{1}{2}(A+B)$ and a signal $S_2+\tfrac{1}{2}(A-B)$ occur at the outputs of adding devices $A_7$ and $A_8$ respectively. At the output of modulator $M_5$ occurs a signal $$S(M_5)=(S_1+\tfrac{1}{2}(A+B)(1\pm 2\cos \omega_p t)$$

and hence:

$$S(M_5)=a+b\cos \omega_1 t+\tfrac{1}{2}(A+B)\pm 2a\cos \omega_p t \pm b\cos(\omega_p+\omega_1)t \pm b\cos(\omega_p-\omega_1)t \pm (A+B)\cos \omega_p t$$

and at the output of modulator $M_6$ occurs a signal:

$$S(M_6)=(S_2+\tfrac{1}{2}(A-B))(1\mp 2\cos \omega_p t)$$

and hence $$S(M_6)=c+d\cos \omega_2 t+\tfrac{1}{2}(A-B)\mp 2c\cos \omega_p t \mp d\cos(\omega_p+\omega_2)t \mp d\cos(\omega_p-\omega_2)t \mp (A-B)\cos \omega_p t$$

The output signals $S(M_5)$ and $S(M_6)$ are supplied to an adding device $A_9$, of which the output signal is:

$$S(M_5)+S(M_6)=a+b\cos \omega_1 t+c+d\cos \omega_2 t+A\pm 2a\cos \omega_p t \pm b\cos(\omega_p+\omega_1)t \pm b\cos(\omega_p-\omega_1)t \mp 2c\cos \omega_p t \mp d\cos(\omega_p+\omega_2)t \mp d\cos(\omega_p-\omega_2)t \pm 2B\cos \omega_p t$$

which is thus similar to the output signal $S(A_1)+S(M_3)$ from adding device $A_6$ of the transmitter shown in Fig. 6. By modulating the said signal in modulator $M_4$ on the carrier wave $\cos \omega_d t$ and limiting the bandwidth of the modulated signal with the use of band-pass filter $F_3$, the signal $S(U)$ is supplied again to transmitting aerial Z.

It is to be noted that the sequence and the shape of the characteristic curves of the filters used in transmitter and receiver are not essential, provided that the total resulting transmission curve for the carrier wave modulated by the sum of the signals $S_1$ and $S_2$ has the shape shown in Fig. 8, that is to say the transmission curve at the frequency $f_b$ must be decreased to half, exhibit radial symmetry relatively to this frequency in the range comprised between $f_a$ and $f_a'$ and have a cut-off frequency which is somewhat smaller than $f_d+f_p$. For the carrier-wave modulated by the difference of the signals $S_1$ and $S_2$, the total transmission curve must have a shape as shown in Fig. 9, that is to say the transmission curve must be decreased to half at the frequency $f_d+f_p$, exhibit radial symmetry relatively to this frequency in the range comprised between $f_b$ and $f_b'$ and have a cut-off frequency which is somewhat higher than $f_d$.

If, for example, the receiver should utilise band-pass filters $F_4$ and $F_5$ having characteristic curves of the shape as shown in Figs. 8 and 9, the transmitter is required to utilise a band-pass filter $F_3$ having a transmission curve as shown in Fig. 10, and hence cut-off frequencies $f_a$ and $f_b$.

It has been assumed so far that the upper side-band of the carrier-wave of the lower frquency contains the sum of the two information signals and the lower side-band of the carrier-wave of the higher frequency contains the difference between the two information signals. It is evident, that, as an alternative, the upper side-band of the carrier wave of the lower frquency may contain the difference between the information signals and the lower side-band of the carrier-wave of the higher frequency may contain the sum of the information signals. In this case the band-pass filters $F_4$ and $F_5$ in the receiver are naturally required to be interchanged.

If desired, it is possible in the transmitter with the use of additional modulating stages to shift the signal S(U) to a different frequency range. The receiver will preferably be of the superheterodyne type so that, if a plurality of transmitters each emit a pair of carrier-waves as mentioned above, all these pairs of carrier-waves are transformed to the same central frequency band and only one set of band-pass filters $F_4$ and $F_5$ is required. Such a frequency transformation, which as such is not essential to the invention, will not be described further hereinafter.

The system so far described, in which two information signals $S_1$ and $S_2$ are required to be transmitted, may be used, for example, for stereo-television and two-colour television.

However, in most cases, three information signals are required to be transmitted such as in three-colour transmission. This may be ensured in the system according to the invention by transmitting the third signal in an adjacent frequency range.

Fig. 11 shows an example of a frequency spectrum for the transmission of three information signals.

The two carrier-waves modulated in the lower and upper side-bands with the sum and the difference, respectively, of the signals $S_1$ and $S_2$ are produced in one of the manners indicated above, which results in a signal extending in frequency between $f_a$ and $f_b$.

The third information signal $S_3$ is limited to a frequency $f_a$.

The two resultant signals are jointly modulated on a main carrier-wave of a frequency $f_h$. At the receiver, the transmitted signal, after being demodulated, is supplied, on the one hand, to a low-pass filter having a cut-off frequency $f_a$ and, on the other, to two band-pass filters as shown in Figs. 4 and 5 and the demodulators connected thereafter. The output signal of the low-pass filter may be supplied to an image tube.

The output signals of the two demodulators are again required to be combined both in the positive and the negative sense, the resultant signals being supplied to the image tubes concerned.

Figure 12:
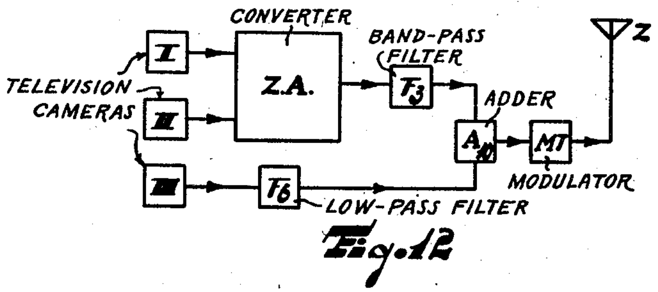
Fig. 12 shows diagrammatically one embodiment of a transmitter for a system according to the invention for the transmission of three television signals and Fig. 13 shows diagrammatically one embodiment of a television receiver co-operating with the transmitter shown in Fig. 12.

Fig. 12 shows in block diagram one embodiment of a transmitter for the multiplex transmission system according to the invention, suitable for the transmission of three-colour television signals.

The devices I, II and III represent television cameras producing information signals $S_1$, $S_2$, $S_3$ respectively. The output signals of the cameras I and II are supplied to a device ZA which converts the signals $S_1$ and $S_2$ into the signal $S(M_1)+S(M_2)=S(M_4)$ and which is identical with the parts surrounded by dash lines, of the transmitters shown in block diagram in Figs. 1, 6 and 7.

The output signal of device ZA is supplied to band-pass filter $F_3$, which exhibits a transmission curve as shown in Fig. 2.

The output signal of camera III is supplied to a low-pass filter $F_6$ having a cut-off frequency $f_a$.

The signals occurring at the output terminals of filters $F_3$ and $F_6$ are combined in an adding device $A_{10}$, the resultant signal being modulated in a modulating stage MT on a high-frequency carrier wave and supplied to transmitting aerial Z.

Figure 13:
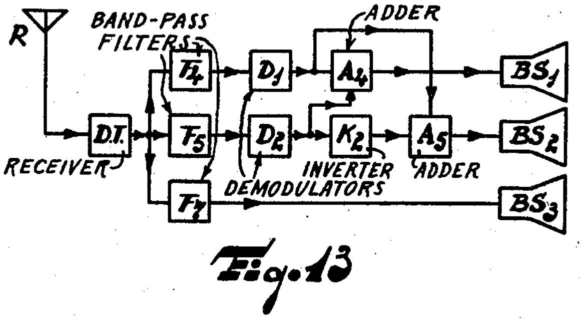

Fig. 13 shows in block diagram one embodiment of a receiver for the multiplex transmission system according to the invention, which receiver is suitable for the reception of signals emitted by the transmitter shown in Fig. 12.

The incoming modulated high-frequency signal is supplied by way of receiving aerial R to the part of the receiver which is indicated by DT and which also comprises a demodulator. The output signal of DT is supplied to a low-pass filter $F_7$ having a cut-off frequency $f_a$ and band-pass filters $F_4$ and $F_5$ having transmission curves as shown in Figs. 4 and 5.

The output signal of low-pass filter $F_7$ is supplied to an image tube $BS_3$.

The output signals of the band-pass filters $F_4$ and $F_5$ are combined after demodulating in both the positive and the negative sense and supplied to image tubes $BS_1$ and $BS_2$ in a similar manner as in the receiver shown in block diagram in Fig. 3.

What is claimed is:

1. A multiplex system for the transmission of television information signals for producing televisoin images having predetermined frame periods comprising transmitting apparatus for providing a transmission signal including means for producing two television information signals and two carrier waves in said transmission signal, one of said carrier waves having its upper sideband overlapping at least part of the lower sideband of the other of said carrier waves, means connected for phasing said carrier waves so that interference in said television images which is due to the overlapping of the sidebands and which occurs during one of said frame periods is substantially compensated visually by a similar disturbance in the subsequent frame period, said carrier waves having a frequency difference at least equal to the highest frequency of said two information signals, means connected to inject the sum of said two information signals plus a constant signal into one of said overlapping sidebands and means connected to inject the difference between said two information signals plus another constant signal into the other of said overlapping sidebands, means coupled to said producing means for suppressing the other sidebands of said carrier waves, and receiving apparatus for intercepting the signals from said transmitting apparatus, said receiving apparatus including two demodulating stages for demodulating said intercepted signals, said two demodulating stages being tuned each to a different one of the two carrier wave frequencies, and means coupled to said two stages for combining the demodulated signals in both the positive and the negative sense.

2. A transmitter in a multiplex system for the transmission of television information signals for producing television images having predetermined frame periods comprising transmitting apparatus for providing a transmission signal including means for producing two television information signals and two carrier waves in said transmission signal, one of said carrier waves having its upper sideband overlapping at least part of the lower sideband of the other of said carrier waves, means connected for phasing said carrier waves so that interference in said television images which is due to the overlapping of the sidebands and which occurs during one of said frame periods is substantially neutralized visually by a similar disturbance in the subsequent frame period, said carrier waves having a frequency difference at least equal to the highest frequency of said two information signals, means connected to inject the sum of said two information signals plus a first constant signal into one of said overlapping sidebands and means connected to inject the difference between said two information signals plus a second constant signal into the other of said overlapping sidebands, and means coupled to said producing means for suppressing the other sidebands of said carrier waves.

3. A transmitter, as set forth in claim 2, including means to modulate one of said carrier waves with the sum of said two information signals plus a constant signal and means to modulate the other of said two carrier waves with the difference between said two information signals plus another constant signal.

4. A transmitter, as set forth in claim 2, including means connected to transform said two information signals together with a direct voltage component, a source of punctuating signals comprising an alternating voltage component having a fundamental frequency at least equal to the highest frequency of said two information signals, means connected to provide said punctuating signals with a phase variation which ensures that interference in said television images which is inherent in said system and which occurs during one of said frame periods, is substantially compensated visually by a similar interference in the subsequent frame period, and by means connected for modulating the two signals obtained by said transformation on the lower frequency carrier wave of said two carrier waves.

5. A transmitter as set forth in claim 2, including means connected to modulate one of said carrier waves with said difference of the two information signals plus said second constant signal, means connected to combine said last-named modulated carrier wave with said sum of the two information signals plus a first constant signal to produce a combined signal, and means connected to modulate the other of said carrier waves with said combined signal.

6. A transmitter as set forth in claim 2, including means connected to modulate one of said carrier waves with said sum of the two information signals plus said first constant signal, means connected to combine said last-named modulated carrier wave with said difference of the two information signals plus a second constant signal to produce a combined signal, and means connected to modulate the other of said carrier waves with said combined signal.

7. In a multiplex system for the transmission of television information signals for producing television images having predetermined frame periods, means for producing a transmission signal including two television information signals and two carrier waves, one of said carrier waves having its upper sideband overlapping at least part of the lower sideband of the other of said carrier waves, means connected for phasing said carrier waves so that interference in said television images which is due to the overlapping of said sidebands and which occurs during one of said frame periods is substantially compensated visually by a similar disturbance in the subsequent frame period, said carrier waves having a frequency difference at least equal to the highest frequency of said two information signals, means connected to inject the sum of said two information signals plus a constant signal into one of said overlapping sidebands and means connected to inject the difference between said two information signals plus another constant signal into the other of said overlapping sidebands; a multiplex receiver comprising means for intercepting said transmission signal, two demodulating stages for demodulating said intercepted signals, each of said stages being coupled to said intercepting means and each being tuned to a different one of the two carrier wave frequencies, and means coupled to said two stages for combining the demodulated signals in both the positive and the negative sense.

References Cited in the file of this patent

UNITED STATES PATENTS

| | | |
|---|---|---|
| 2,559,843 | Bedford | July 10, 1951 |
| 2,635,140 | Dome | Apr. 14, 1953 |